3 Sheets--Sheet 1.

H. KING.
Scribers.

No. 157,841.

Patented Dec. 15, 1874.

WITNESSES

INVENTOR
Harry King

By Attorney

H. KING.
Scribers.
No. 157,841. Patented Dec. 15, 1874.
3 Sheets--Sheet 2.
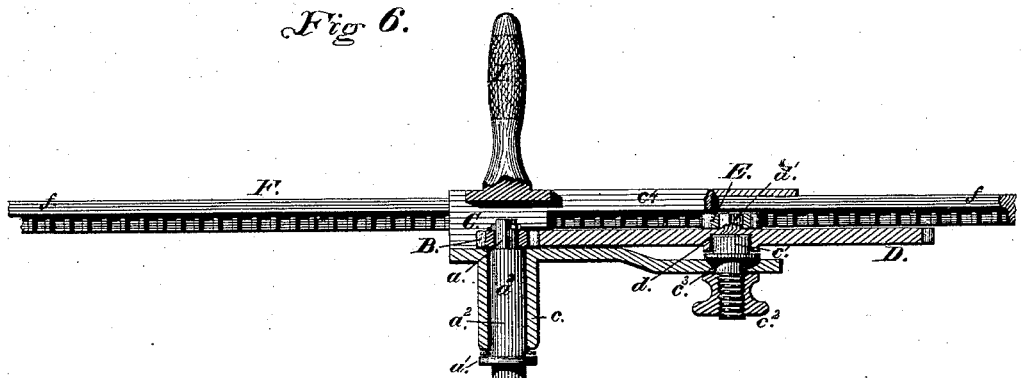
Fig. 6.
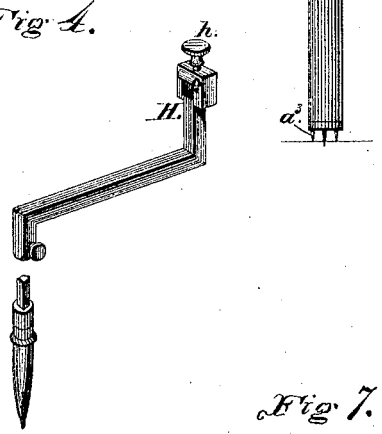
Fig. 4.
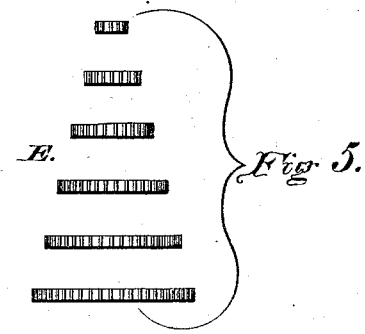
Fig. 5.
Fig. 7.
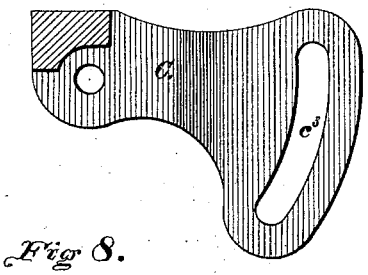
Fig. 8.
WITNESSES
H. H. Young
Wm J. Peyton
By Attorney
INVENTOR
Harry King 3 Sheets--Sheet 3.
H. KING.
Scribers.
No. 157,841. Patented Dec. 15, 1874.
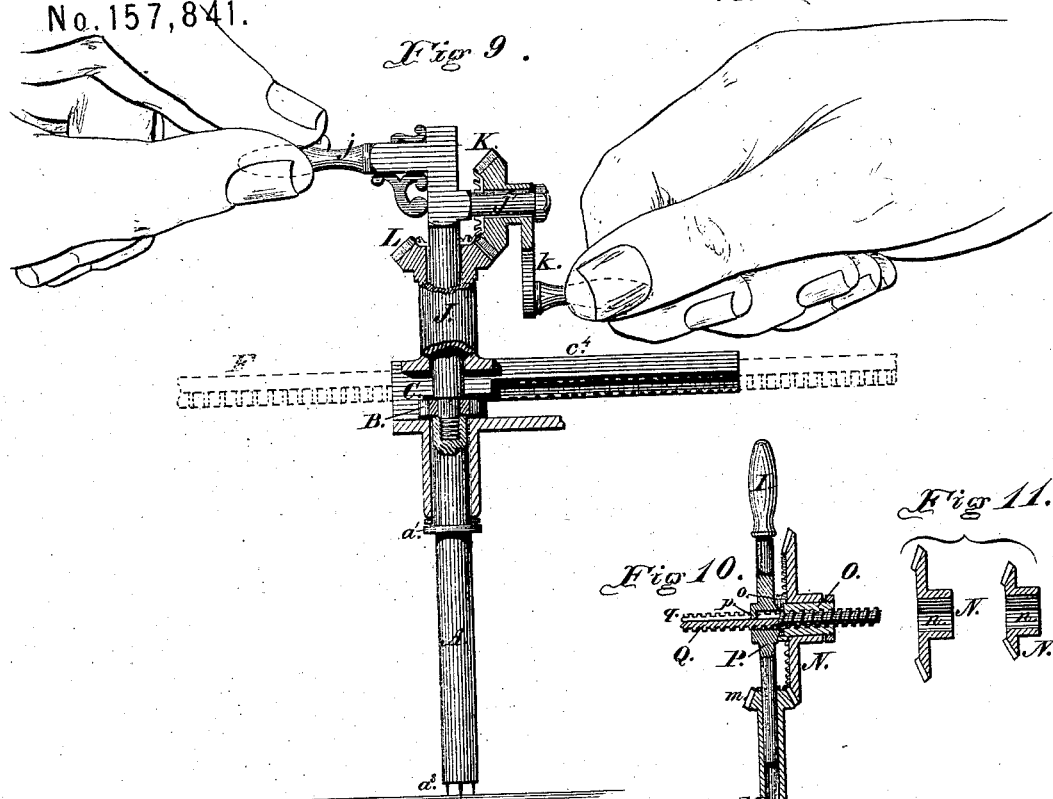
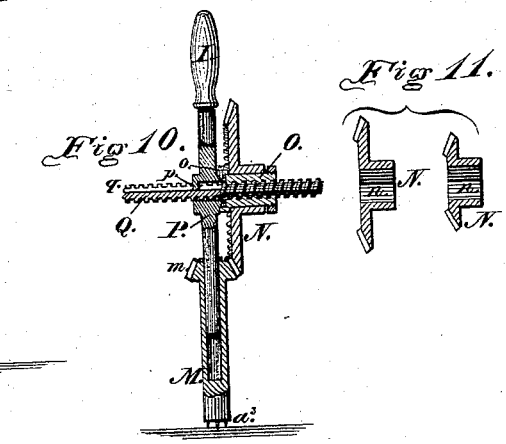
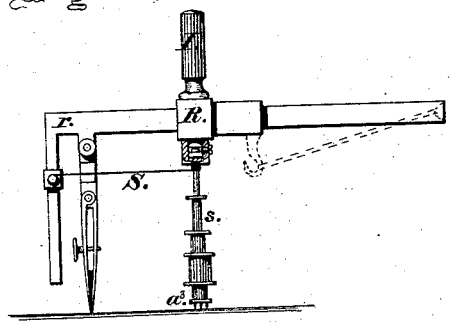
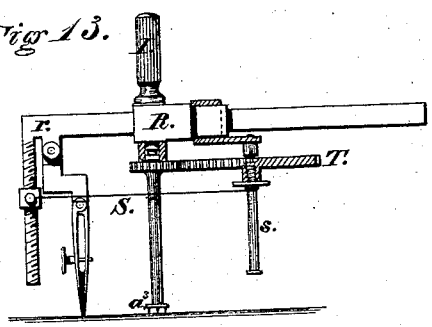
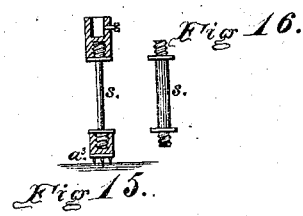
WITNESSES
H. H. Young
Wm. J. Peyton
INVENTOR
Harry King
By           Attorney

UNITED STATES PATENT OFFICE.

HARRY KING, OF WASHINGTON, DISTRICT OF COLUMBIA.

IMPROVEMENT IN SCRIBERS.

Specification forming part of Letters Patent No. 157,841, dated December 15, 1874; application filed December 2, 1874.

*To all whom it may concern:*

Be it known that I, HARRY KING, of Washington city, in the District of Columbia, have invented certain new and useful Improvements in Combined Scroll, Volute, and Circling Instruments, of which the following is a specification:

The object of my invention is to scribe, in drawing or engraving, either a mathematically true coil or volute of any desired density, by means of positive mechanism, or a circle of any desired radius; to which ends my improvements consist, first, in providing a fixed shaft with a pinion rigidly secured thereon, an adjustable gear-wheel traversing around and meshing in said rigid pinion, and axially working in an independent bearing on a radially-revolving frame, actuating, by drawing or repelling, a rack-bar, either directly or indirectly, through the medium of supplemental pinions of any desired diameter, said rack-bar sliding through a guide in said radially-revolving frame; second, in constructing the instrument so as to admit of its being used to scribe a scroll or circle of either set or movable radius, or to shade any plane surface; third, in constructing the instrument so as to be adjustable to scribe either a right or left coil or volute; fourth, in providing sockets in both the right and left coil or volute mechanism, so as to allow of a pen, pencil, engraving-point, or milling-instrument being used.

The construction and operation of my invention are hereinafter more fully set forth.

Figure 1:
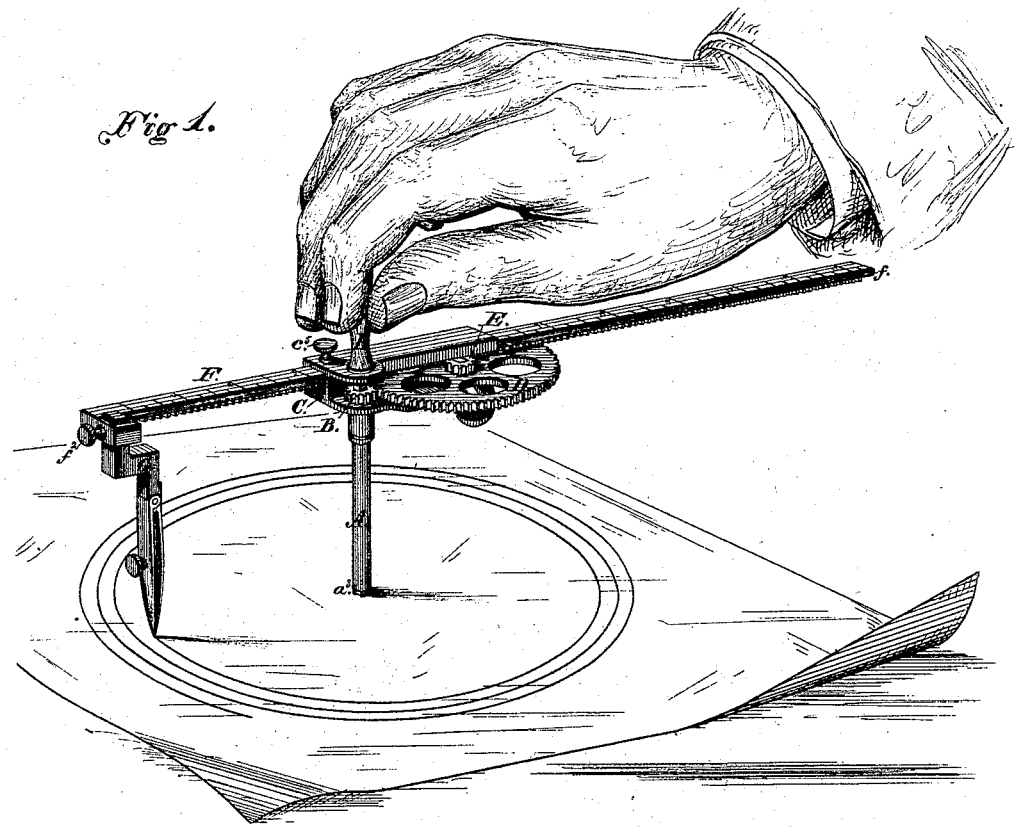
Figure 2:
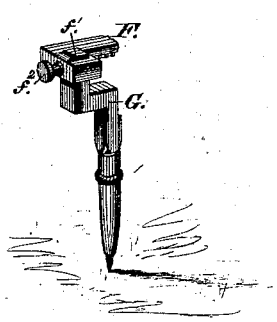
Figure 3:
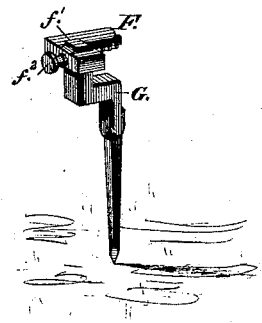

In the drawings, Figure 1 represents a perspective view of my improved instrument with pen-point attached. Fig. 2 represents a perspective view of a pencil-point secured in the end of the rack-bar. Fig. 3 represents a perspective view of an engraving-point secured in the end of the same. Fig. 4 represents a perspective view of the socket used in the formation of a left coil or volute. Fig. 5 represents a view of a nest of pinions, by which the density of the coil or volute is regulated. Fig. 6 represents a side elevation of the greater portion of one form of my apparatus, slightly enlarged and partly in section. Fig. 7 represents a plan view of a portion of the frame, showing a segmental slot. Fig. 8 represents a side view of a male and female socket when the rack-bar is formed in sections. Fig. 9 represents a side elevation of the greater portion of another form of my apparatus, slightly enlarged and partly in section. Fig. 10 represents a similar view of a greater portion of another modified form, slightly reduced and partly in section. Fig. 11 represents a view of a nest of bevel-gear wheels in vertical section, to be used with modification shown in Fig. 10. Figs. 12 and 13 represent views in side elevation of other modified forms of my invention, slightly reduced. Fig. 14 represents a similar view of the thread used in Figs. 12 and 13. Figs. 15 and 16 represent similar views of adjustable drums to be used in modifications shown in Fig. 12; and Fig. 17 represents an end elevation of a portion of the modification shown in Fig. 13.

My invention admits of several modified forms; but the one I prefer especially to allude to and first describe is shown in Figs. 1, 6, and 9, the latter involving the same principle of operation as the two former, with the exception of the method of imparting motion to the instrument. The other modified forms will be described in their order.

Upon the upper end of a rigid shaft, A, is formed a post, $a$, polygonal in its transverse section, over which is securely fixed a pinion, B, with correspondingly-shaped perforation. Between this pinion and a collar, $a^1$, the stem forms a journal, $a^2$, around which revolves a sleeve, $c$, which forms a part of the revolving frame C. The shaft A is fixed by means of two or more needle-points, $a^3$, or any other well-known equivalent device secured to the base of said shaft; or the instrument may be clamped to the edge of the drawing-board or table by means of any well-known clamping device. Upon this frame, and independently revolving upon a bearing, $c^1$, adjustable by means of a set-screw, $c^2$, working in a segmental slot, $c^3$, in the frame, is a gear-wheel, D, meshing into the teeth of the rigid pinion B. This gear-wheel is provided with a recess, $d$, on its under side, which forms a cap loosely fitting over the set-bearing $c^1$.

Molded on the upper face of the gear-wheel is a post, $d'$, in its transverse section similar to the post on the rigid shaft. Seated on this post in a manner similar to the fixed pinion is any one of different-sized pinions, E. (See Fig. 5.) These pinions differ in their diameters, for purposes hereinafter set forth, and are so constructed in regard to the post as to be easily slipped on or off. Sliding through a guide, $c^4$, in the frame is a rack-bar, F. The teeth of this rack-bar mesh with the teeth of the pinion E, so that as the pinion is revolved it feeds the rack-bar either backward or forward, as the instrument is turned either one way or the other. A flange, $f$, is provided on the rack-bar, running its entire length, for the purpose of protecting the teeth from abrasures, and also acting to secure the pinion E firmly on its post. In one end of the rack-bar is a socket, $f^1$, and clamping-screw $f^2$. This socket receives the upper end G of either a pen, Fig. 1, pencil, Fig. 2, or engraving-point, Fig. 3.

It is obvious that, instead of a pen, pencil, or engraving-point, a milling-tool may be inserted in this socket, for the purpose of dressing the surfaces of metal, or for the purpose of milling a coiled groove in the surface of the same. The rack-bar may be made in sections, and provided with smooth socket-joints, as seen at Fig. 8.

The instrument, as shown in Fig. 1, is adjusted to scribe or cut what I have termed a right coil. To scribe or cut a left coil I detach the pen, pencil, engraving-point, or milling-instrument from the end of the rack-bar having the socket in it, and attach either one desired to the opposite end of the rack-bar by means of a detachable socket, H, and clamp-screw $h$. (Shown in Fig. 4.) To convert the coil into a circling-instrument it is only necessary to loose the set-screw $c^2$ and slide the pinion E on the gear-wheel D out of gear with the rack-bar, when said bar ceases to be fed backward or forward by the revolution of the pinion as the instrument is operated. The gear D, bearing on its face the pinion E, if necessary, can be simply lifted off its bearings and laid aside while the instrument is being used to engrave or cut a circle. The bar can then be slid backward or forward with the hand, so as to scribe or cut a circle of any desired radius.

As a guide for a mathematical adjustment of the bar for scribing or cutting a circle, I divide one of the faces of said bar into a scale of inches, as shown in Fig. 1. For the purpose of setting the circling-instrument at any given radius I provide a set-screw, $c^5$, Fig. 1.

The instrument can be operated by one hand when a common circling pen-handle, I, is rigidly secured to and forms a part of the frame C, Figs. 1, 6, 10, 12, and 13, or by two hands, (see Fig. 9,) when the rigid shaft is continued up through a hollow sleeve, J. (See Fig. 9.) The upper end of this continued portion of the rigid shaft is angled, so as to form a handle, $j$, through which additional rigidity is given to the shaft A. An extra shaft, $j'$, is provided on and runs at right angles to the continued shaft. On this shaft turns a bevel-gear wheel, K, to which is attached a crank, $k$. This bevel-gear wheel meshes into a corresponding gear-wheel, L, formed on the upper end of the sleeve K.

The operation of my invention is as follows: The frame C, carrying the feeding mechanism, is revolved around the fixed shaft A, bearing the pinion B, by one hand, as in Fig. 1, or by two hands, as in Fig. 9. The large gear-wheel D, in radially revolving around the fixed pinion B, has a certain amount of axial revolution imparted to it, which is also imparted to the pinion E, seated on the gear-post $d'$. This revolution of the pinion causes the rack-bar, in which it meshes, to slide either backward or forward, according to the direction in which the frame is revolved. At the same time the bar is sliding, and consequently carrying with it the engraving-point, pen, pencil, or milling-instrument, in a radial direction, the revolution of the frame imparts to it a circumferential movement, which, when taken together, causes the engraving or cutting point, pen, or pencil to traverse a path coil-shaped. This radial motion can be increased or diminished, while the same speed in circumferential movement is observed, by using either a larger or smaller pinion, E, on the gear-wheel post. In increasing or diminishing the radial motion, (otherwise the feed of the rack-bar,) it will be obvious that the coil which the instrument is engraving, cutting, or scribing will be of greater or less density, said density being regulated by the size of the pinion used.

It is obvious that the radial feed can be increased or diminished by using rigid pinions B of different diameters, the slot in the frame being made of such shape as to allow of a radial adjustment of the gear-wheel as well as circumferential.

Fig. 10 shows a modified form of my invention. In this construction a bevel-pinion, $m$, rigidly connected to the fixed shaft M, revolves a bevel-gear, N, as it is carried around the rigid pinion. These bevel-gear wheels are of different diameters, as shown in Fig. 11, but are all provided with the same-sized polygonal-shaped socket $n$, which fits over a correspondingly-shaped nut, O. This nut is provided with a collar and lug or screw $o$, which rides in a groove. The lug, riding in the groove, loosely attaches the axially-revolving nut to the radially-revolving frame P. A screw-bar, Q, is fed backward or forward by means of the revolving nut O, slowly or rapidly, according to the large or small size of the bevel-gear wheel actuating said nut. This screw-bar is guided in its to-and-fro motion by means of lip $p$ riding in groove $q$, which runs the entire length and parallel to the axis of the screw-bar.

Figs. 12 and 13 show other constructions of my invention, embodying, however, similar principles of adjustable mechanism for the purpose of feeding the slide-bar in a radial direction while it is traveling in its circumferential path.

In Fig. 12, as the frame R is revolved, a string, S, one end of which is secured to the slide-bar $r$, and the other end to any one of a series of differently-sized drums, $s$, becomes wound upon such drum, by means of which the point or pen is gradually and at one fixed rate attracted to the fixed center, thus causing the point or pen to cut or scribe a coil in its path around said center. The drums can be all formed on the rigid shaft, or they may be separate and detachable by means of screw-threads, as shown in Figs. 15 and 16.

In Fig. 13 the drum revolves and winds up the string, having its revolution imparted to it by means of mechanism similar to that used in Figs. 1, 6, and 9. The radial feed occasioned by the string winding around the drum is varied by using drums of different diameters, or by using different-sized gear-wheels E with the one size of drum.

Having thus fully described my invention, what I claim is—

1. The drawing-instrument hereinbefore described, consisting of the combination of a supporting-post, a frame revolving thereon, a radially-moving rack-bar carrying the instrument, and planetary gearing for imparting a regulated radial movement to said instrument as it revolves.

2. The combination, substantially as hereinbefore set forth, of the frame of the instrument, the radially-moving rack-bar, and the laterally-adjusting changeable pinions, whereby the density of the coils may be regulated.

3. The combination, substantially as set forth, of the flanged rack-bar with the laterally-adjustable pinion overlapped by it, whereby the pinion is held in place by the flange on the rack.

4. The combination of the frame, the planetary gearing, and an elongated rack-bar moving in a plane parallel with the face of the gearing, and adapted to receive an instrument at either end to draw right or left coils.

HARRY KING.

Witnesses:
H. H. YOUNG,
B. H. MORSE.